(12) United States Patent
Walters et al.

(10) Patent No.: US 12,205,144 B2
(45) Date of Patent: *Jan. 21, 2025

(54) SYSTEMS AND METHODS FOR MESSAGE MANAGEMENT IN LOCALIZED NETWORKS

(71) Applicant: Capital One Services, LLC, McLean, VA (US)

(72) Inventors: Austin Walters, Savoy, IL (US); Jeremy Goodsitt, Champaign, IL (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,912

(22) Filed: Dec. 6, 2023

(65) Prior Publication Data

US 2024/0177195 A1    May 30, 2024

Related U.S. Application Data

(63) Continuation of application No. 17/845,018, filed on Jun. 21, 2022, now Pat. No. 11,887,162, which is a
(Continued)

(51) Int. Cl.
*G06Q 30/02* (2023.01)
*G06N 5/02* (2023.01)
(Continued)

(52) U.S. Cl.
CPC ........... *G06Q 30/0261* (2013.01); *G06N 5/02* (2013.01); *G06N 20/00* (2019.01); *H04W 4/029* (2018.02); *H04W 4/23* (2018.02)

(58) Field of Classification Search
CPC ............... G06Q 30/02; G06Q 30/0261; G06Q 30/0254; G06Q 10/067; G06Q 30/0246;
(Continued)

(56) References Cited

U.S. PATENT DOCUMENTS 7,680,786 B2 * 3/2010 Koran ................ G06Q 30/0246
705/28
8,983,859 B2 * 3/2015 Nice .................. G06Q 30/0269
705/14.66
(Continued)

FOREIGN PATENT DOCUMENTS

JP     2009-538095 A   * 10/2009   .............. H04W 4/06
JP     2009-540474 A     11/2009
(Continued)

OTHER PUBLICATIONS

Kalyanasundaram, A.; Lalkhanwar, R.A.K; Rao, S, Fail-Stop Distributed Combinatorial Auctioning Systems with fair resource allocation (English), 2011 IEEE International Conference on Automation Science and Engineering (pp. 151-188), Aug. 1, 2011 (Year: 2011).*

(Continued)

*Primary Examiner* — Marilyn G Macasiano
(74) *Attorney, Agent, or Firm* — HUNTON ANDREWS KURTH LLP

(57) ABSTRACT

A system comprises a network and a message management system. The message management system can apply a predictive model to generate a broadcast event message for transmission over the network to solicit message requests for entry into a bidding process. The bidding process can be associated with an event in the region and a bidding timeframe. The message management system can receive message requests for the event during the bidding timeframe, and select one of the message requests from a selected requestor after the expiration of the bidding timeframe. The message management system can receive an event message from the selected requestor. The message management system can present the event message via the communication (Continued)

service. The event message can be provided at an access point for the Wi-Fi service.

21 Claims, 12 Drawing Sheets

Related U.S. Application Data continuation of application No. 17/166,623, filed on Feb. 3, 2021, now Pat. No. 11,386,460.

(51) Int. Cl.
*G06N 20/00* (2019.01)
*G06Q 30/0251* (2023.01)
*H04W 4/029* (2018.01)
*H04W 4/23* (2018.01)

(58) Field of Classification Search
CPC ...... G06Q 30/0207; G06N 5/02; G06N 20/00; G06N 3/044; G06N 3/045; G06N 3/08; H04W 4/029; H04W 4/23; H04W 4/06; H04L 12/1845
See application file for complete search history.

(56) References Cited

U.S. PATENT DOCUMENTS

| | | | |
|---|---|---|---|
| 9,189,791 B2 | 11/2015 | Farkas et al. | |
| 9,734,515 B1 | 8/2017 | Belser et al. | |
| 10,290,025 B1* | 5/2019 | Howes | G06Q 30/0261 |
| 10,489,828 B2 | 11/2019 | Toval | |
| 10,528,986 B2* | 1/2020 | Seljan | G06Q 30/0277 |
| 10,832,315 B2* | 11/2020 | Dhondse | G06F 30/20 |
| 2002/0026361 A1 | 2/2002 | Blom | |
| 2002/0046104 A1 | 4/2002 | Kaddeche et al. | |
| 2002/0160793 A1 | 10/2002 | Pradhan et al. | |
| 2004/0137886 A1 | 7/2004 | Ross et al. | |
| 2006/0063515 A1 | 3/2006 | Alston | |
| 2006/0217110 A1 | 9/2006 | Othmer | |
| 2006/0259359 A1 | 11/2006 | Gogel | |
| 2008/0082402 A1 | 4/2008 | Turrentine | |
| 2009/0094111 A1 | 4/2009 | Wu et al. | |
| 2009/0187659 A1 | 7/2009 | Savoure | |
| 2009/0234706 A1* | 9/2009 | Adams | G06Q 30/0275 705/37 |
| 2010/0145809 A1* | 6/2010 | Knapp | G06Q 30/08 705/14.71 |
| 2010/0148276 A1* | 6/2010 | Uhlig | H01L 21/8249 257/370 |
| 2010/0268599 A1 | 10/2010 | Montesdeoca | |
| 2010/0332305 A1 | 12/2010 | Higgins et al. | |
| 2011/0055014 A1 | 3/2011 | Kim | |
| 2011/0231264 A1* | 9/2011 | Dilling | G06Q 30/0275 705/14.71 |
| 2012/0150639 A1 | 6/2012 | Li et al. | |
| 2012/0179527 A1 | 7/2012 | Ball et al. | |
| 2012/0209717 A1 | 8/2012 | Henry et al. | |
| 2012/0253928 A1* | 10/2012 | Jackson | G06Q 30/02 705/14.49 |
| 2012/0278175 A1 | 11/2012 | Agarwal et al. | |
| 2013/0054370 A1 | 2/2013 | Lehmann | |
| 2013/0211917 A1 | 8/2013 | Etchegoyen | |
| 2014/0100944 A1* | 4/2014 | Zhu | G06Q 30/0275 705/14.71 |
| 2014/0164162 A1* | 6/2014 | Rabenold | G06Q 30/08 705/26.3 |
| 2014/0180795 A1 | 6/2014 | Hull et al. | |
| 2014/0316892 A1 | 10/2014 | L'Heureux et al. | |
| 2014/0344049 A1* | 11/2014 | Fairchild | G06Q 30/0246 705/14.45 |
| 2015/0310500 A1* | 10/2015 | Nolet | G06Q 30/02 705/14.66 |
| 2016/0132932 A1 | 5/2016 | Lingvay | |
| 2018/0005269 A1 | 1/2018 | Sotomayor | |
| 2018/0033081 A1* | 2/2018 | Karas | G06Q 30/08 |
| 2020/0219145 A1* | 7/2020 | Kalampoukas | G06Q 30/0277 |

FOREIGN PATENT DOCUMENTS

| | | | | |
|---|---|---|---|---|
| JP | 2013-502018 A | | 1/2013 | |
| JP | 2013/052936 A1 | | 3/2013 | |
| JP | 5934460 B2 | * | 6/2016 | ............ G06Q 30/08 |
| WO | 2010/017402 A2 | | 2/2010 | |
| WO | 2013/006440 A1 | | 1/2013 | |

OTHER PUBLICATIONS

Z. Despotovic; J.-C. Usunier; K. Aberer, Towards peer-to-peer double auctioning (English), 37th Annual Hawaii International Conference on System Sciences, 2004. Proceedings of the (2004, Page(s): 8 pp.), Jan. 1, 2004 (Year: 2004).*
Jin-Hee Cho; Swami, A; Cook, T., Combinatorial auction-based multiple dynamic mission assignment (Englsih), 2011—MILCOM 2011 Military Communications Conference (2011, pp. 1327-1332), Nov. 1, 2011 (Year: 2011).*
Wang et al., "Display Advertising with Real-Time Bidding (RTB) and Behavioural Targeting" (English), Oct. 7, 2016 (Year: 2013).
Yuan et al., "Real-Time Bidding for Online Advertising Measurement and Analysis" (English), Jun. 27, 2013 (Year: 2013).
Paulose, S.M.; Venkatesan, R.; Ramalakshmi, K., Trusy, "Oriented Resource Allocation using Bidding" (English, 2011 3rd International Conference on Electronics Computer Technology (vol. 2, pp. 142-146), Apr. 1, 2011 (Year: 2011).
Lucas S. Brito; Marcelo M. Carvalho, "Per-Hop Reversed Packet Auctions for Cooperative Routing in Mobile Wireless Networks" ( English), IEEE Access (vol. 9, pp. 36308-36327), Jan. 1, 2021 (Year: 2021).
Ummy Habiba; Ekram Hossain, Auction Mechanisms for Virtualization in 5G Cellular Networks: Basics, Trends, and Open Challenges (English), IEEE Communications Surveys & Tutorials (vol. 20, Issue: 3, pp. 2264-2293), Jul. 1, 2018 (Year: 2018).

* cited by examiner

600

SYSTEMS AND METHODS FOR MESSAGE MANAGEMENT IN LOCALIZED NETWORKS

CROSS-REFERENCE TO RELATED APPLICATION

This application is a continuation of U.S. patent application Ser. No. 17/843,018 filed Jun. 21, 2022, which is a continuation of U.S. patent application Ser. No. 17/166,623 filed Feb. 3, 2021, now U.S. Pat. No. 11,386,460, the complete disclosures of which are incorporated herein by reference in their entireties.

FIELD OF THE INVENTION

The present disclosure generally relates to localized networks and, in particular, to systems and methods for message management in localized networks.

BACKGROUND

Location-based marketing for mobile phones has many problems. For example, many mobile phone users are hesitant to share their location. As a result, only a fraction of the potential audience may be targeted. As another example, it may not be obvious why users would want to share their location or how it might benefit them. When faced with an overwhelming number of location requests from apps, social media platforms, and websites, users feel less inclined to share their data. In addition, users cite privacy concerns as the main reason why they turn off their location settings. Users are concerned that businesses will share their data with other services or present undesired messages, and the more data that is shared, the higher the risk of a privacy breaches or instances of sharing that the user is unaware of or of which the user would not approve. Further, it is difficult for advertisers to cut through the noise and make sure their messages are noticed.

As another example, locations sometimes are inaccurate due to unreliable methods of pulling data, moving devices, poor interpretation of data, urban density, or outdated data. Some degree of reliability is needed for advertisers to provide relevant and timely messages.

As another example, there may be some overlap in communication infrastructure and data delivery, such as Wi-Fi networks, routers, or cell towers that makes targeted messages difficult. Advertisers desire to effectively deliver advertisements to consumers while avoiding multiple deliveries and expenditures associated with multiple delivery mechanisms and blanket broadcasts. Advertisers also desire advertisements that are targeted to relevant audiences and that are likely to promote sales and business growth.

Accordingly, there is a need for an alternative to location-based message management that efficiently and effectively manages messages in localized networks without impinging on user privacy.

SUMMARY

The disclosed subject matter is directed to systems and methods for message management in localized networks that satisfy these needs.

An example embodiment of the present disclosure can be a system that comprises a network and a message management system. The network can provide a communication service to a region. The network can be a cell tower that provides a wireless data service.

The message management system can be in data communication with the network. The message management system can send a broadcast message over the network. The broadcast message can solicit message requests for entry into a bidding process. The bidding process can be associated with an event in the region and a bidding timeframe. The message management system can receive message requests for the event during the bidding timeframe. The message management system can select one of the message requests from a selected requestor, after the expiration of the bidding timeframe. The message management system can receive an event message from the selected requestor. The message management system can present the event message via the communication service. The event message can be provided at an access point for the wireless data service.

The system can further comprise a point of sale device. The point of sale device can receive payment information from the selected requestor, process the payment information from the selected requestor; and receive a payment associated with the payment information from the selected requestor.

The system can further comprise a database that stores an account for the selected requestor. The database can store the event, the bidding timeframe, and the message requests. The database can store the event message from the selected requestor.

The system can further comprise a webserver that accepts application programming interface requests for the message management system to receive message requests.

An example embodiment of the present disclosure can be a method. Advertising bids can be solicited during a bidding timeframe for an event that is located in a network service area. Advertising bids can be received for the event. Upon expiration of the bidding timeframe, one of the advertising bids can be selected from a selected bidder. The selected bidder can be provided with advertising rights for the event. An advertisement can be received from the selected bidder. The advertising bids can be filtered by accepting or rejecting each of the advertising bids. A bidder associated with a rejected bid can be blocked. A blacklist of bidders associated with rejected bids can be stored. The event can have an event timeframe. The advertising rights can be limited to the event timeframe. The event can be a repeating event and the bidding timeframe can be a repeating bidding timeframe. The bidding timeframe can include incremental time slots. Selecting one of the advertising bids can be performed by choosing the largest payment. Selecting one of the advertising bids can include weighting the advertising bids according to categories.

An example embodiment of the present disclosure can be an application, comprising a bid interface for sending an advertising bid; a bid status interface for receiving a status of a bid at the end of a bidding timeframe; a payment interface for sending payment information; an advertisement interface for sending an advertisement; and an advertising manager.

The advertising manager can solicit advertising bids associated with an event in a network and a bidding timeframe. The advertising manager can receive advertising bids for the event during the bidding timeframe. The advertising manager can select one of the advertising bids from a selected bidder upon expiration of the bidding timeframe. The advertising manager can receive payment information from the selected bidder. The advertising manager can receive the advertisement from the selected bidder. The advertising manager can present the advertisement at an access point for the network. The advertising manager can collect payment associated with the payment information.

These and other features, aspects and advantages of the disclosed subject matter are explained in greater detail with reference to specific example embodiments that are illustrated in the following description, appended claims, and accompanying drawings.

DETAILED DESCRIPTION OF EXAMPLE EMBODIMENTS

Figure 1:
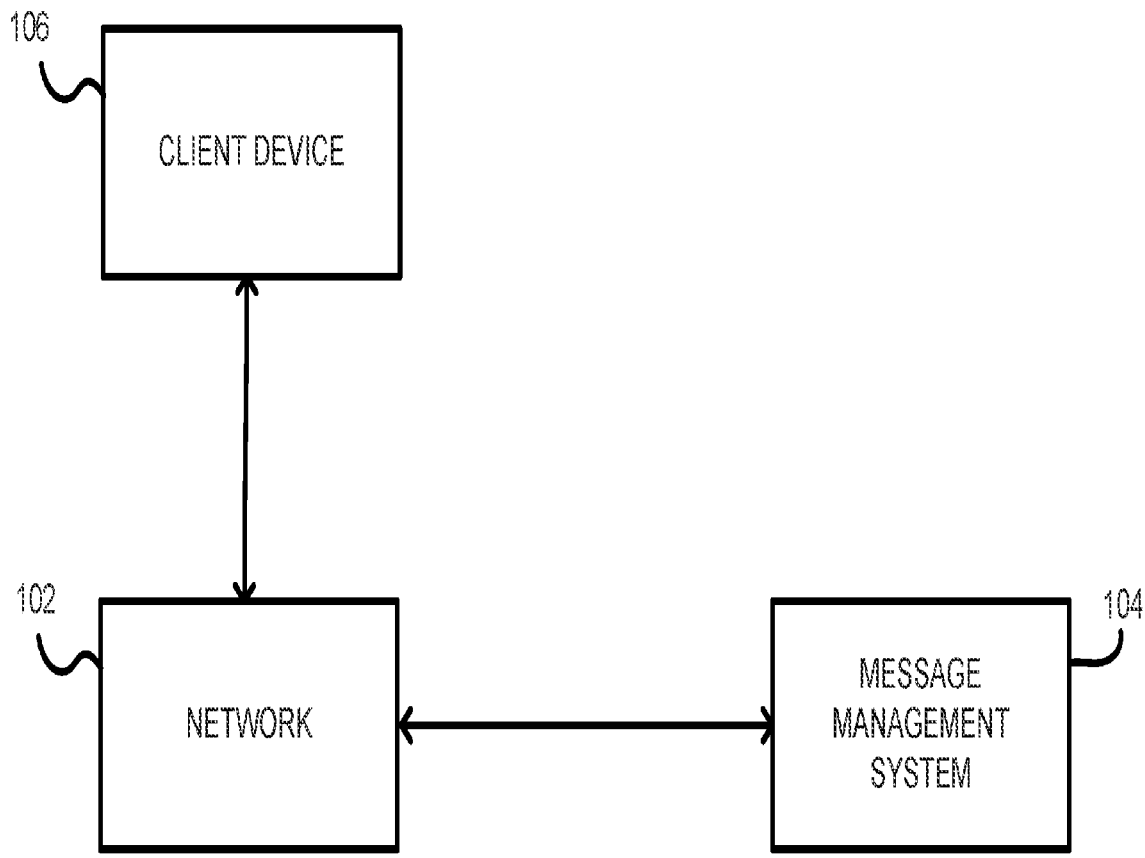
FIG. 1 is a diagram of a system for message management in localized networks according to an example embodiment of the disclosure.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The present invention can provide for a message management on localized networks. Exemplary embodiments provide for targeting messages to particular users, which may result in more relevant messages for users, a more efficient allocation of advertising resources for advertisers, and a competitive advantage in attracting users and advertisers and for a network that can provide this functionality.

In some examples, messages can be targeted by message management systems to a particular broadcasting device or network, such as a cell tower, Wi-Fi router, satellite network, network-enabled computer, or other device, and target the client devices or users connected to the broadcasting device or network. In other examples, messages can be targeted to a subset of the client devices or users connected to a broadcasting device or network. In other examples, a combination of the broadcasting device, network, client devices, and users, can be targeted. Information can be collected by the receipt of access tokens, device profiles, and/or user accounts upon user or their associated client devices accessing the network.

Exemplary embodiments may provide for increased user protections, by limiting content to users of particular age, location, and in compliance with federal, state, and local laws. For example, if an advertisement relating to alcohol would be broadcast in an area where minors may not view such advertisements, the message management system can preclude the broadcast of the advertisement to users identified as minors or devices associated with users that are minors. As another example, if part of a broadcast range includes a dry county (i.e., a county that prohibits the consumption of alcohol), the message management system can preclude the broadcast of an advertisement for alcohol to users or devices located in that county. As another example, if a state law permits only persons over the age of 18 to participate in a state lottery, an advertisement for the lottery can only be broadcast to users identified as over 18 years old or devices associated with users that are over 18 years old.

Exemplary embodiments further provide for a bidding process that dynamically incorporates message management system data. For example, the message management system can present to advertisers and potential advertisers data relating to the users and devices currently on the network that are eligible to view an advertisement or the particular broadcast of an advertisement. In some examples, this can involve the report of the total number of users and devices on the network, the total number of users and/or devices associated with users meeting at certain age, location, transaction history, and/or preference information.

Exemplary embodiments can accordingly provide numerous advantages to consumers, advertisers, potential advertisers, and network administrators. By limiting user exposure to restricted, illegal, or otherwise inappropriate content, protection of users can be increased. By providing advertisements more accurately tailored to the user's preferences and interest, users may find advertisements to be more useful. By securely collecting and utilizing voluntarily provided user information, user privacy can be promoted.

Advertisers and potential advertisers can benefit from a more data-focused advertisement bidding process and from more insight into the users and other relevant data associated with a particular network at the time of bidding. Advertisers and potential advertisers can benefit from the ability to efficiently target advertisements to the users, networks, and geographic areas where the advertisements are likely to be most effective.

Network administrators can benefit from the foregoing advantages in making their services more competitive for advertisers, potential advertisers, and users. Network administrators can also benefit from efficient and thorough compliance with laws and regulations.

FIG. 1 is a diagram of a system 100 for message management in localized networks according to an example embodiment of the disclosure. The system can comprise a network 102, a message management system 104, and a client device 106. The network 102 can provide communication service to a region. For example, the network 102 can be a cell tower that provides wireless data, such as cellular data and/or Wi-Fi service, to a coverage area. As another example, the network 102 can be a satellite network that provides wireless data service to a region or globally. The message management system 104 can be a network-enabled computer in data communication with the network 102. The client device 106 can be a network-enabled computer in data communication with the network 102. While FIG. 1 illustrates a single network 102, message management system 104, and client device 106, it is understood that the system 100 can include one or a plurality of network 102, message management system 104, and client device 106, in any combination thereof. For example, many client devices 106 can be in communication with a single network 102.

As referred to herein, a network-enabled computer may include, but is not limited to a computer device, or communications device including, e.g., a server, a network appliance, a personal computer, a workstation, a phone, a hand-held computer, a personal digital assistant, a thin client, a fat client, an Internet browser, a mobile device, or other device. For example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

In the system 100, a network-enabled computer such as the message management system 104 can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein.

In the system 100, a network-enabled computer can include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's device that is available and supported by the user's device, such as a touch-screen, keyboard, mouse, cursor-control device, touch-screen, microphone, digital camera, video recorder or camcorder. These devices can be used to enter information and interact with the software and other devices described herein. In some examples, the network-enabled computer can execute one or more applications, such as software applications, that enable, for example, network communications with one or more components of the system 100 and transmit and/or receive data.

In the system 100, the client device 106 can be a network-enabled computer in communication with one or more servers via one or more networks 102, and can operate as a respective front-end to back-end pair with the server. A client device 106 can transmit, for example from a mobile device application executing on the client device 106, one or more requests to the server. The one or more requests can be associated with retrieving data from the server. The server can receive the one or more requests from the client device 106. Based on the one or more requests from the client device 106, the server can be configured to retrieve the requested data from one or more databases. Based on receipt of the requested data from the one or more databases, the server can be configured to transmit the received data to the client device. For example, the received data can be responsive to one or more requests.

The network 102 can be one or more of a wireless network, a wired network or any combination of wireless network and wired network, and can be configured to connect the client device to the server. For example, the network 102 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

The network 102 can include, without limitation, telephone lines, fiber optics, IEEE Ethernet 902.3, a wide area network, a wireless personal area network, a LAN, or a global network such as the Internet. The network 102 can support an Internet network, a wireless communication network, a cellular network, or the like, or any combination thereof. The network 102 can further include one network, or any number of the exemplary types of networks mentioned above, operating as a stand-alone network or in cooperation with each other. The network 102 can utilize one or more protocols of one or more network elements to which they are communicatively coupled. The network 102 can translate to or from other protocols to one or more protocols of network devices. Although the network 102 is depicted as a single network, it should be appreciated that according to one or more examples, the network 102 can comprise any number of interconnected networks, such as, for example, the Internet, a service provider's network, a cable television network, corporate networks, such as credit card association networks, and home networks.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of a device within the network 102, the message management system 104, and/or client device 106, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Figure 2:
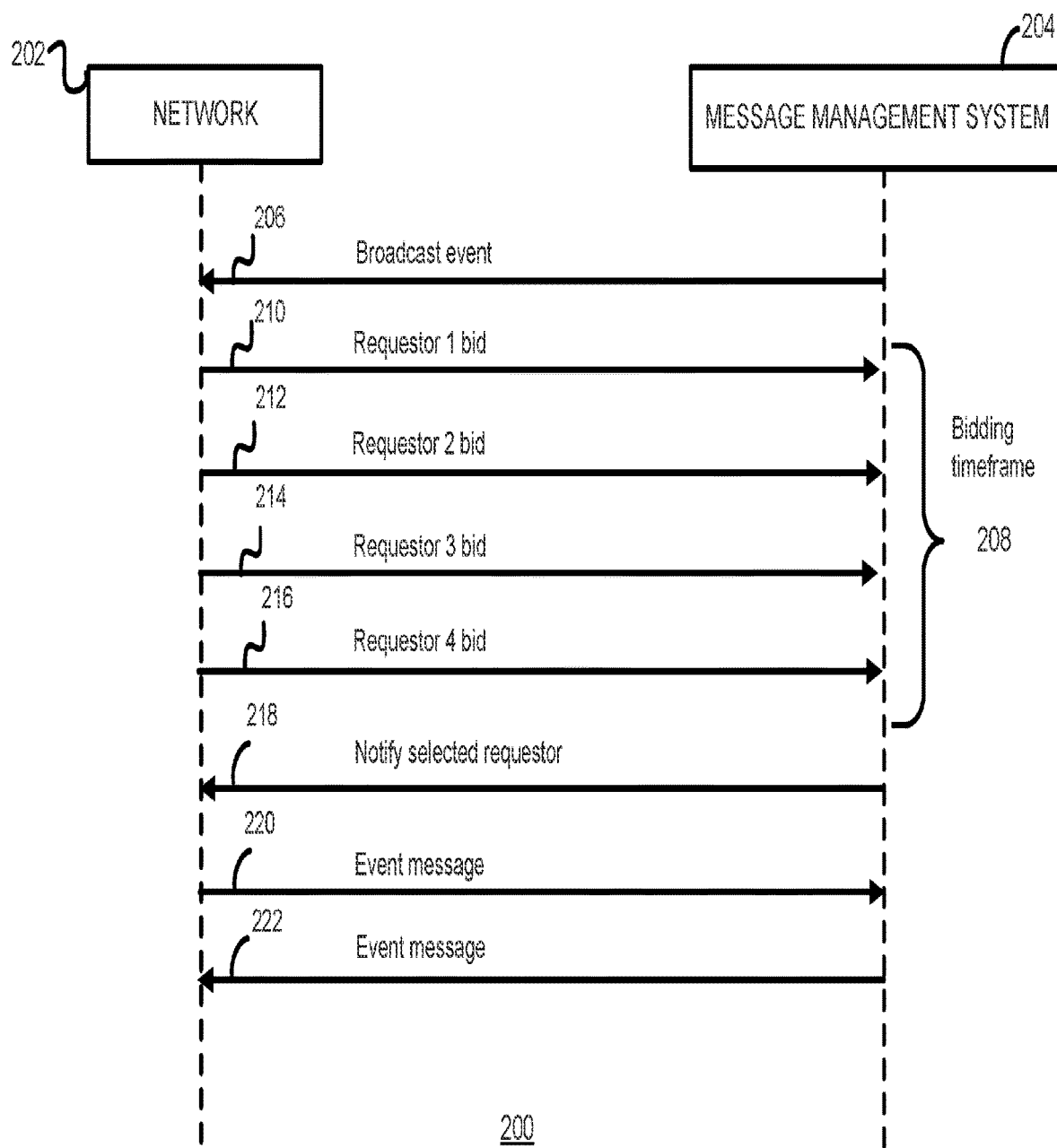
FIG. 2 is sequence diagram for messaging in a system according to an example embodiment of the disclosure.

FIG. 2 is sequence diagram for messaging in a system 200 according to an example embodiment of the disclosure. The system 200 can include a network 202 and a message management system 204 in data communication with the network 202. The network 202 can provide a communication service to a region The message management system 204 can send a broadcast event message 206 over the network 202 about an event in the region. The broadcast event message 206 can solicit message requests for entry into a bidding process. The bidding process can be associated with the event in the region and a bidding timeframe 208. The message management system 204 can receive message requests for the event during the bidding timeframe 208.

In some examples, the broadcast event message 206 can include bid information relevant to the bidding process. The bid information can include, without limitation, type of advertisement (e.g., audio, video, streaming), advertisement content, advertisement length, frequency of advertisement presentations (e.g., a one time advertisement, a fixed number of presentations, a recurring presentation with an end date, presentation in association with a particular one-time or recurring event), new device targeting (e.g., supplemental presentations of the advertisement to each new device connecting to the network after the initial presentation), the number of devices in communication with the network, device characteristics for those devices (e.g., device brand, device model, device features such as display size, data connectivity, etc.), location of devices, the number of users connected to the network, demographic information about users (e.g., age, location), and user information such as user transaction history (e.g., interests, affiliations, prior transactions, goods and services purchased, advertisements viewed) and user preference information (e.g., likes, dislikes, reviews, ratings, social media information, dietary preferences, dietary restrictions), and any additional user-supplied data. In some examples, user information can be analyzed to establish user characteristics including, without limitation, frequency of travel, favorite destinations, favorite types of destinations (e.g., beaches, parks, sports stadiums, music venues, movie theaters), entertainment preferences, food preferences, hobbies, and interests. In some examples, the bid information can be updated periodically, or continuously as this information changes, by sending one or more subsequent broadcast event messages 206 or by sending supplemental messages to update a portion of the information contained in the broadcast event message 206.

During the bidding timeframe 208, the message requests can be from any network-enabled computers in the network 202. For example, four message requests from four different network-enabled computers, i.e., requestor 1, requester 2, requestor 3, and requestor 4, in the network 202 can respectively send a requestor 1 bid message 210, a requestor 2 bid message 212, a requestor 3 bid message 214, and a requestor 4 bid message 216. The message management system 204 can select one of the message requests from a selected requestor, after the expiration of the bidding timeframe 208. For example, the selected requestor may be the network-enabled computer requestor 3 in the network 202 that sent the requestor 3 bid message 214. The message management system 204 can send notify selected requestor message 218 to the network-enabled computer requestor 3 in the network 202. The message management system 204 can receive an event message 220 from the selected requestor. The message management system 204 can present the event message 222 via the communication service provided by the network 202. For example, the event message 222 can be provided at an access point for a Wi-Fi service.

The system 200 can further comprise a network-enabled computer that is a point of sale device in the network 202. The point of sale device can receive payment information from the selected requestor, process the payment information from the selected requestor; and receive a payment associated with the payment information from the selected requestor. For example, the point of sale device can collect money and transfer the money to an essential depository at the end of the day.

The system 200 can further comprise a database that stores an account for the selected requestor in the network 202. The database can store information about the event, the bidding timeframe, the message requests, and the event message from the selected requestor.

The system 200 can further comprise a networked enabled computer that is a webserver in the network 202. The webserver can accept application programming interface requests for the message management system 204 to receive message requests.

The message management system 204 can use any communication channel or communication protocol to send messages. For example, the broadcast event message 206 can be a cell broadcast text message soliciting bids through a keyword and short code, a website with an application for submitting bids, a phone number to call, or any other way to solicit bids and manage the bidding process. For example, the requestor 1 bid 210 can be a text message containing a bid for the broadcast event. For example, the requestor 2 212 bid can be a bid placed using an automated phone service. For example, the requestor 3 bid 214 can be a bid submitted using a form on a website, where a link to the website was in the broadcast event message 206. For example, notify selected requestor message 218 can be a text message containing a link to a website for receiving the event message 220 from the selected requestor. For example, the event message 222 can be a cell broadcast text message. For example, the event message 222 can be an advertisement provided with the service.

Cell broadcast can be used by system 200 when the message management system 204 sends a broadcast event message 206 over the network 202 about an event in the region. The network 202 in the system 200 can include, for example, a cell tower and the message management system can send messages using cell broadcast.

Cell broadcast is also known as short message service-cell broadcast (SMS-CB). Unlike short message service point-to-point (SMS-PP), cell broadcast is a one-to-many geo-targeted and geo-fenced messaging service. Cell broadcast is a standard method of sending messages to multiple mobile telephone users in a defined area at the same time. The standards for cell broadcast is defined by The European Telecommunications Standards Institute's (ETSI) Global System for Mobile Communications (GSM) committee and The Third Generation Partnership Project (3GPP). Cell broadcast is part of the standards for cellular network technology, including second generation (2G), third generation (3G), fourth generation (4G) Long-Term Evolution (LTE), and fifth generation (5G).

One cell broadcast message can reach a large number of mobile phones at once. For example, sending out a public warning message to millions of people can take less than 10 seconds. Cell broadcast messages are directed to radio cells, rather than specific individuals. A cell broadcast message is an unconfirmed push service, where the originator of the cell broadcast message does not know who has received the message, protecting privacy. Cell broadcast is not affected by network traffic congestion; therefore it is very suitable during a large event or a disaster when load spikes sometimes cause network slowdowns.

Cell broadcast messages have a maximum length of 1,395 characters. Each cell broadcast message has the same message identifier indicating the source of the message and the same serial number. Using this information, a mobile phone is able to identify and ignore broadcasts of already received messages. A cell broadcast message page is composed of 82 octets, which can encode 93 characters. Up to 15 of these pages may be concatenated to form a cell broadcast message so that the maximum length is 1,395 characters.

Cell broadcast has been adopted by several network operators and can be used for a number of different services such as Early Warning System (EWS) for citizen alert, advertising, and information services. EWS has already been adopted by a few countries in the world, in addition to older and already existing forms of communication like siren, radio and TV. Fast, mass communication EWS messages can be sent to mobile phones in a region without needing to know the phone numbers. For advertising, retail outlets can use cell broadcast to notify potential customers in certain areas about special offers, attractions, sales, extended opening times, and pop-up stores. Shopping centers, exhibition halls, airports, sports stadiums, and other kinds of locations can be targeted for cell broadcast based services. For information services, cell broadcast can deliver local or regional information to all the people in a location or region, rather than just one or a few people. For example, cell broadcast can be used to send hazard warnings, cinema programs, local weather, flight or bus delays, tourist information, parking and traffic information. Cell broadcast can also be used for managing and communicating with a remote but local team such as emergency services, standby workers, or airport staff. The emergency services can send a message to officers or other staff in a certain area to respond to an incident there.

Cell broadcast can deliver location-based services while maintaining user privacy. The messages are not sent to specific individuals but rather to mobile phones within a certain area, removing any concerns over privacy. The Cell Broadcast channel on mobile phones can easily be switched on and off by users, providing them with a simple means of opting in and out of location-based advertising or other services Cell broadcast can enable near instantaneous, location-specific communication. For example, cell broadcast can enable specialist interest channels, sponsored by brands and opted in to by consumers. Football fans, for example, can get live score updates in real-time on a service sponsored by sporting goods companies. Users know they will receive advertising, but they agree to it due to the compelling nature of the content they receive. For example, a food chain can send cell broadcasts to everyone in a shopping center with their latest offer and details on how to get to their concession stand. For example, a promoter at a music festival can send cell broadcast messages to all attendees on which acts are starring on which stages, or which bars are offering drinks promotions. Wherever companies wish to send marketing and promotional materials that are relevant to a distinct location, cell broadcast can enable near instantaneous, location-specific communication, boosting the success of an advertising campaign and generating good will from consumers.

FIGS. 3A-3D illustrate several different exemplary network systems that can be used for sending cell broadcast messages.

Figure 3A:
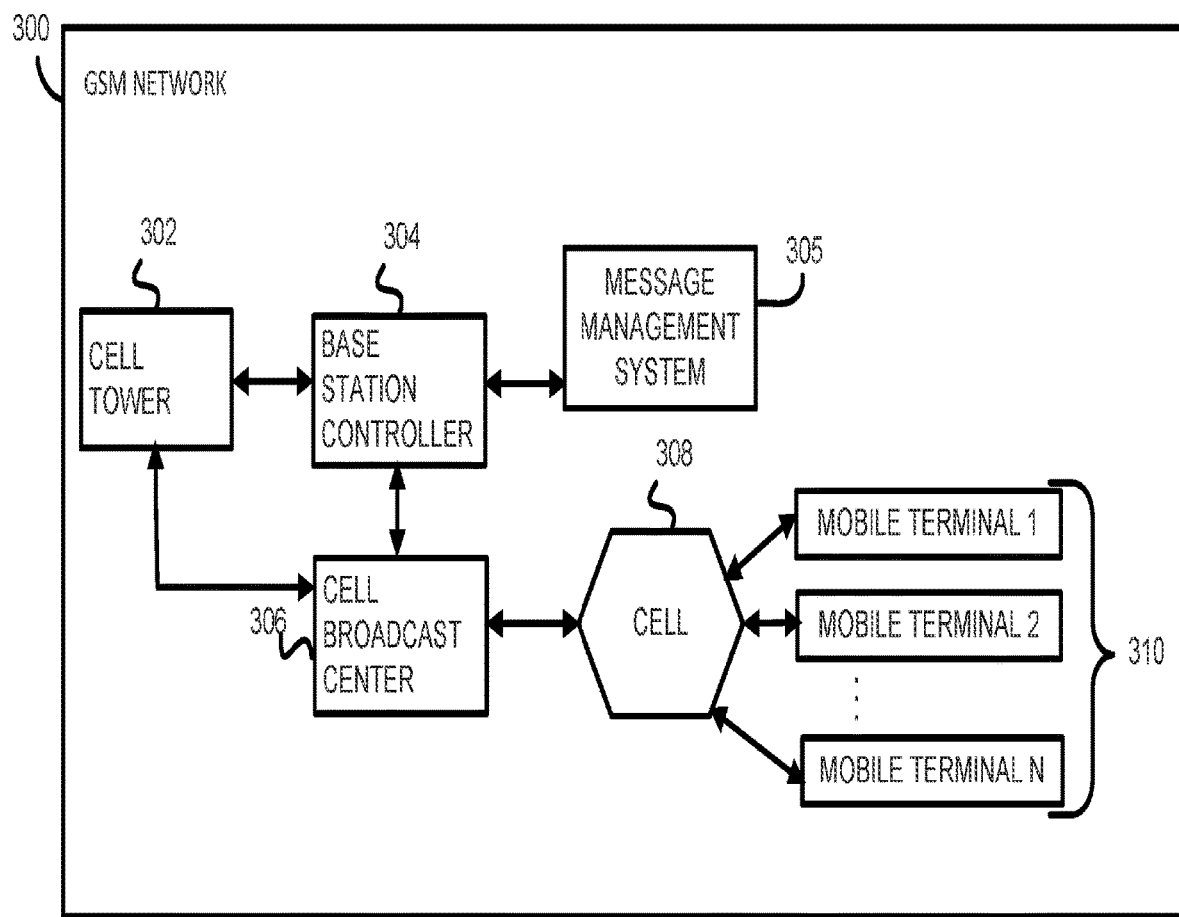
FIG. 3A is diagram of a Global System for Mobile Communications (GSM) network according to an example embodiment of the disclosure.

FIG. 3A is diagram of a Global System for Mobile Communications (GSM) network 300 according to an example embodiment of the disclosure. The GSM network 300 can include a cell tower 302, a base station controller 304, a message management system 305, and a cell broadcast center 306, where antennae, transmitters, receivers, transceivers, digital signal processors, control electronics, power sources, and various other electronic communications equipment can create a cell 308 in the GSM network 300. The cell 308 includes a number of mobile terminals 310 that can be connected to the cell tower 302 for service. The cell broadcast center 306 is connected to the base station controller 304. The message management system 305 can initiate a cell broadcast message about an event by interacting with the base station controller 304, which in turn interacts with the cell broadcast center 306. The cell broadcast center 306 can send cell broadcast messages to the cell 308, which is the coverage area in which service can be provided. The cell broadcast center 306 can send a cell broadcast message and the base station controller 304 can deliver the message to a base station and/or nodes, which handle the cell 308.

Figure 3B:
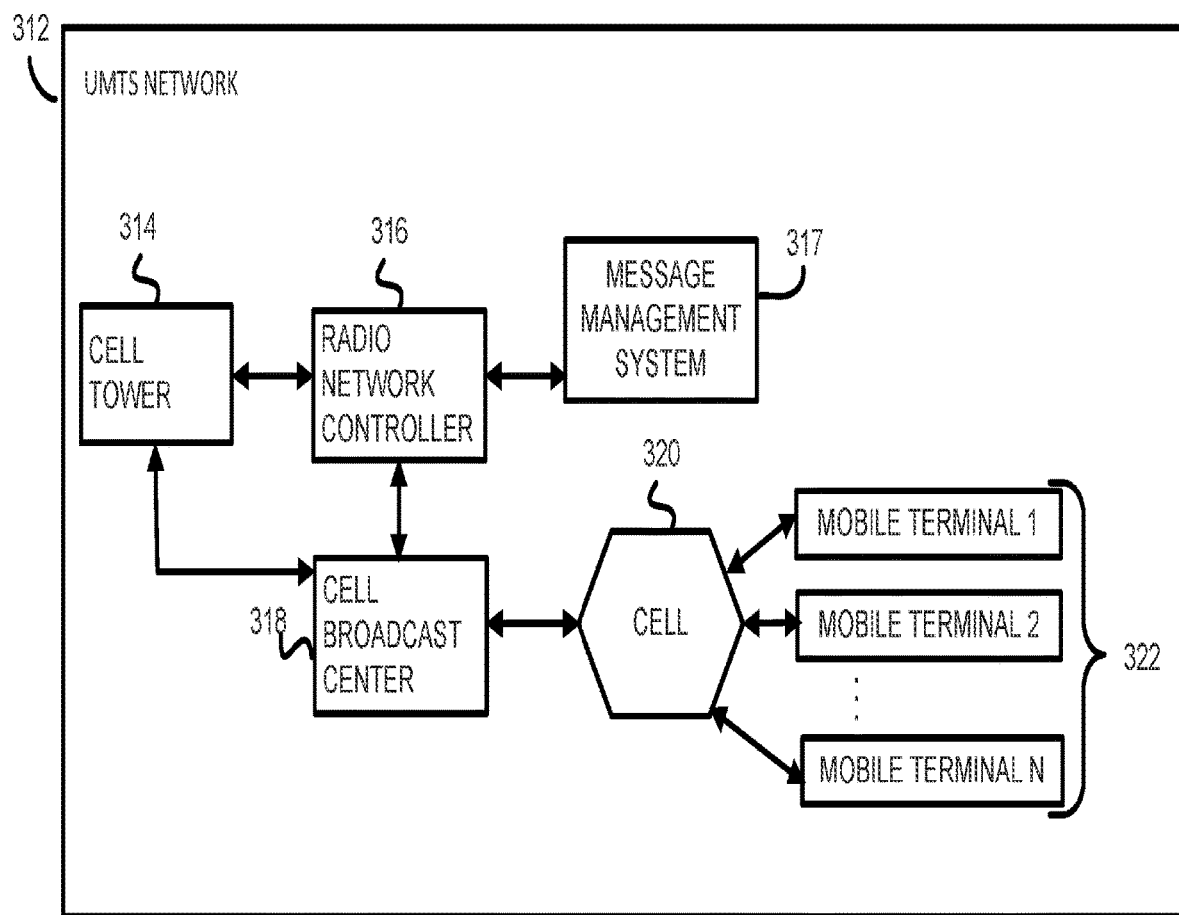
FIG. 3B is diagram of a Universal Mobile Telecommunications Service (UMTS) network according to an example embodiment of the disclosure.

FIG. 3B is diagram of a Universal Mobile Telecommunications Service (UMTS) network according to an example embodiment of the disclosure. The UMTS network 312 can include a cell tower 314, radio network controller 316, a message management system 317, and a cell broadcast center 318, where antennae, transmitters, receivers, transceivers, digital signal processors, control electronics, power sources, and various other electronic communications equipment can create a cell 320 in the UMTS network 312. The cell 320 includes a number of mobile terminals 322 that can be connected to the cell tower 314 for service. The cell broadcast center 318 is connected to the radio network controller 316. The message management system 317 can initiate a cell broadcast message about an event by interacting with the radio network controller 316, which in turn interacts with the cell broadcast center 318. The cell broadcast center 318 can send cell broadcast messages to the cell 320, which is the coverage area in which service can be provided. The cell broadcast center 318 can send a cell broadcast message and the radio network controller 316 can deliver the message to a base station and/or nodes, which handle the cell 320.

Figure 3C:
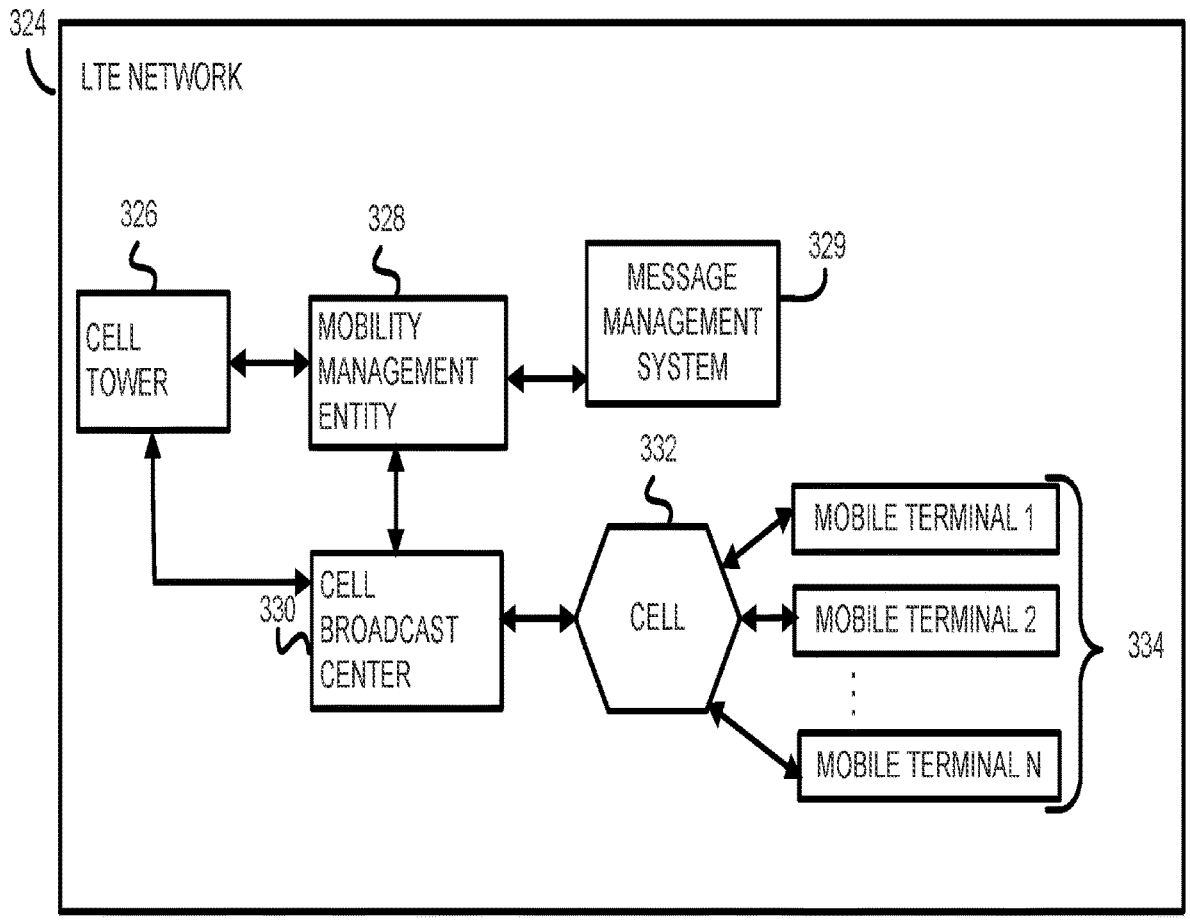
FIG. 3C is diagram of a Long-Term Evolution (LTE) network according to an example embodiment of the disclosure.

FIG. 3C is diagram of a Long-Term Evolution (LTE) network according to an example embodiment of the disclosure. The LTE network 324 can include a cell tower 326, a mobility management entity 328, a message management system 329, and a cell broadcast center 330, where antennae, transmitters, receivers, transceivers, digital signal processors, control electronics, power sources, and various other electronic communications equipment can create a cell 332 in the LTE network 324. The cell 332 includes a number of mobile terminals 334 that can be connected to the cell tower 326 for service. The cell broadcast center 330 is connected to the mobility management entity 328. The message management system 329 can initiate a cell broadcast message about an event by interacting with the mobility management entity 328, which in turn interacts with the cell broadcast center 330. The cell broadcast center 330 can send cell broadcast messages to the cell 332, which is the coverage area in which service can be provided. The cell broadcast center 330 can send a cell broadcast message and the mobility management entity 328 can deliver the message to a base station and/or nodes, which handle the cell 332.

Figure 3D:
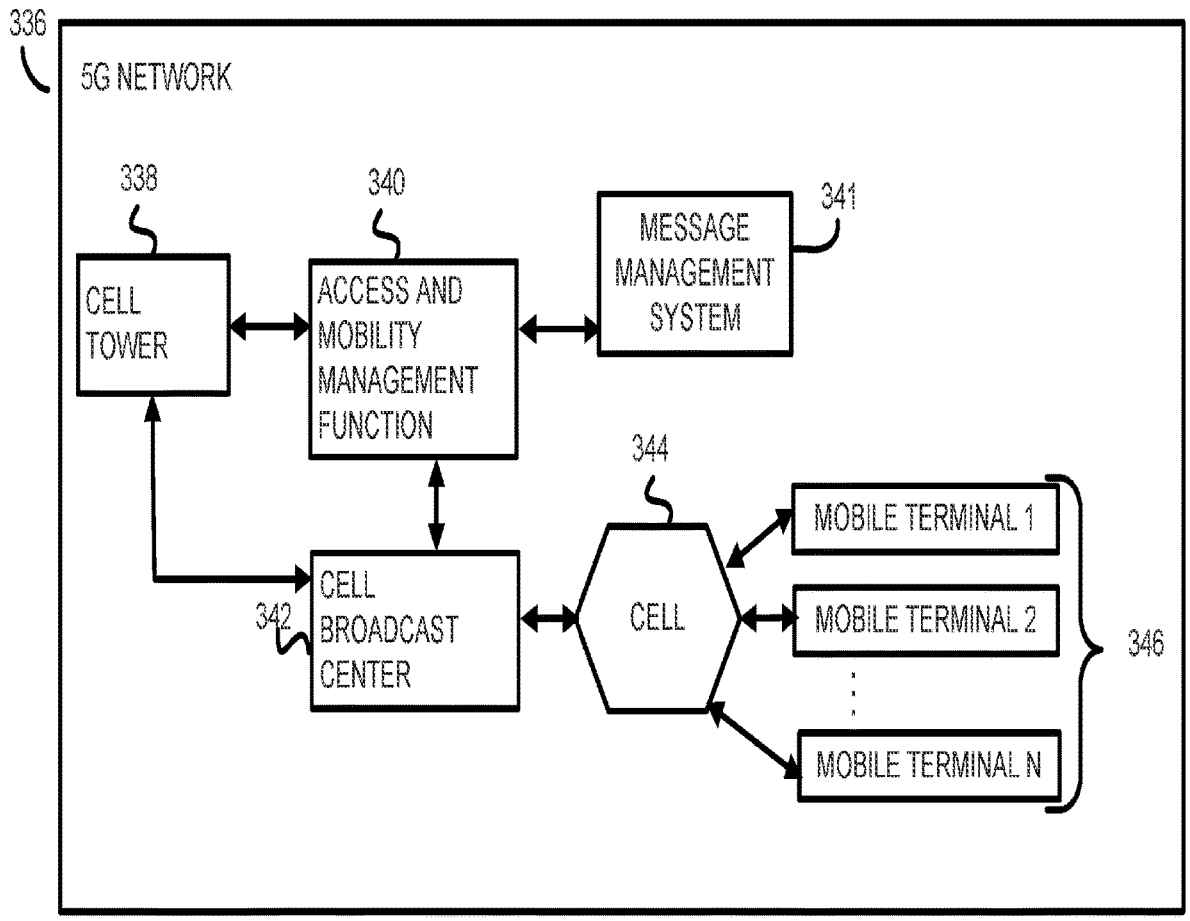
FIG. 3D is diagram of a 5G network according to an example embodiment of the disclosure.

FIG. 3D is diagram of a 5G network according to an example embodiment of the disclosure. The 5G network 336 can include a cell tower 338, an access and mobility management function 340, a message management system 341, and a cell broadcast center 342, where antennae, transmitters, receivers, transceivers, digital signal processors, control electronics, power sources, and various other electronic communications equipment can create a cell 344 in the 5G network 336. The cell 344 includes a number of mobile terminals 346 that can be connected to the cell tower 338 for service. The cell broadcast center 342 is connected to the access and mobility management function 340. The message management system 341 can initiate a cell broadcast message about an event by interacting with the access and mobility management function 340, which in turn interacts with the cell broadcast center 342. The cell broadcast center 342 can send cell broadcast messages to the cell 344, which is the coverage area in which service can be provided. The cell broadcast center 342 can send a cell broadcast message and the access and mobility management function 340 can deliver the message to a base station and/or nodes, which handle the cell 344.

Figure 4:
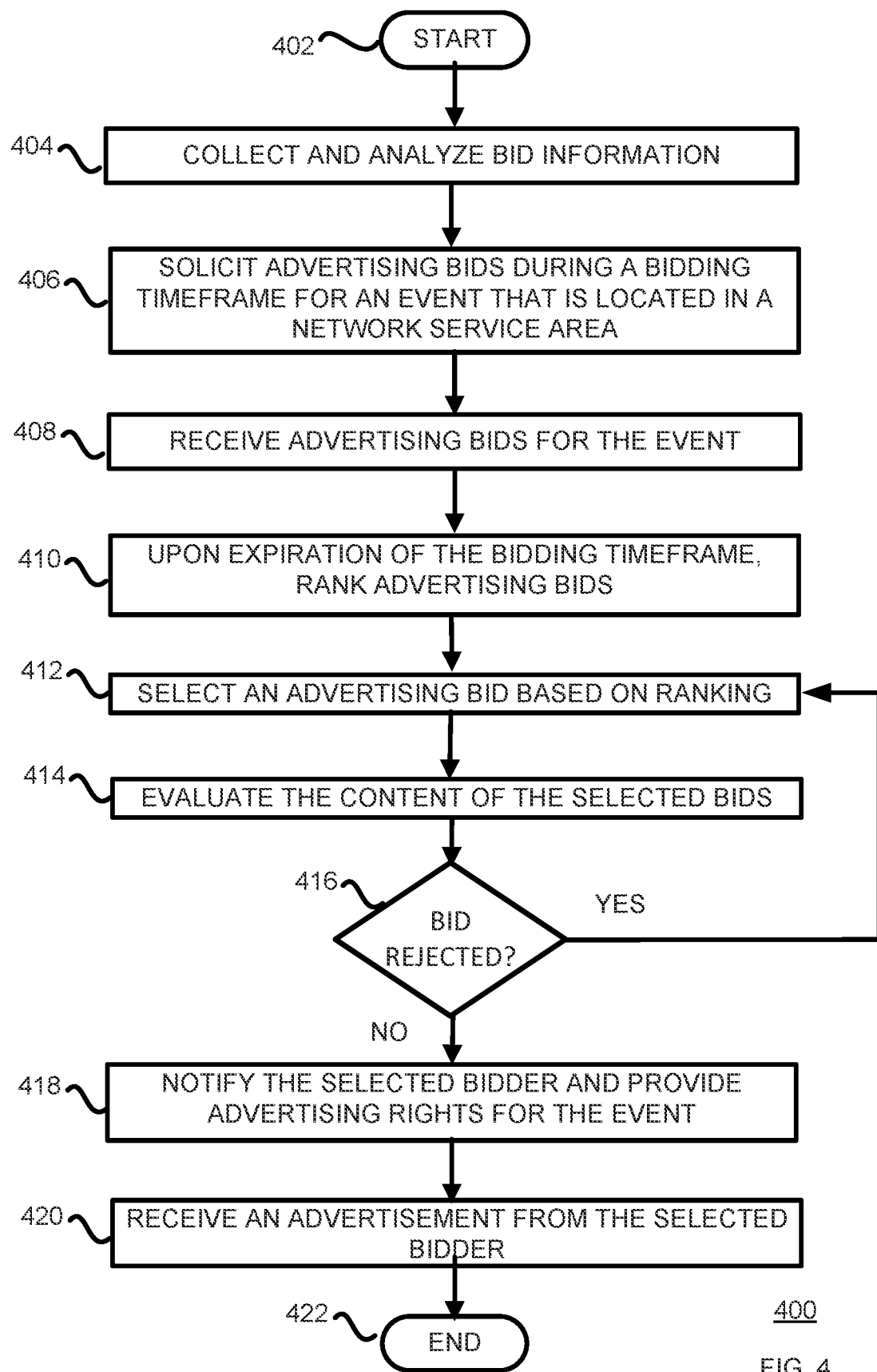
FIG. 4 is flow chart of a method for message management in localized networks according to an example embodiment of the disclosure.

FIG. 4 is flow chart of a method 400 for message management in localized networks according to an example embodiment of the disclosure. The method 400 starts at block 402.

A block 404, bid information can be collected and analyzed. Bid information can include any information relevant to the bid, including without limitation, the number of devices in communication, device characteristic for those devices (e.g., device brand, device model, device features such as display size, data connectivity, etc.), the number of users connected to the network, demographic information about users (e.g., age, location), and user information, such as transaction history and preference information (e.g., interests, affiliations, prior transactions, goods and services purchased, advertisements viewed). In some examples, the bid information can be updated periodically, or continuously as the bid information changes. For example, the bid information can be updated as new users and their associated client devices connect to the local network and provide new information. These update can be part of a periodic check, e.g., every minute, every 15 minutes, every hour, or continuously such that each new connection is reflected in the update in real-time.

At block 406, advertising bids can be solicited during a bidding timeframe for an event that is located in a network service area. A broadcast event message can be generated and transmitted to solicit bids. For example, a cell broadcast message can be sent to solicit bids to sponsor Wi-Fi in a football stadium to all the mobile terminals near the stadium with a bidding timeframe that ends before the game starts. In some examples, in the event bid information changes, or more subsequent broadcast event messages or by sending supplemental messages to update a portion of the bid information contained in the broadcast event message.

At block 408, advertising bids can be received for the event. For example, bids can be received on a website application, by text message, or phone call. For example, bids can be received by a bid or payment system such that it ensures transaction of payment before the bid is accepted. For example, bids can be discarded if they fail to meet certain minimum requirements. For example, a bidder can preload an account that allows them to make a bid. If no pre-check or evaluation is made on bids, a deficient bid can be rejected at block 416 of method 400.

At block 410, upon expiration of the bidding timeframe, the bids can be ranked. For example, bids can be ranked primarily by price and secondarily by location. For example, the bids can be ranked by expected value. Any kind of ranking, weighting and/or sorting of the bids can be done. For example, different categories of advertisements can be given different weights and then the bids can be ranked by weight.

At block 412, one of the advertising bids can be selected from a selected bidder. This selection can be made based on the ranking performed at block 410. In some examples, bid selection criteria can include the highest price, the geographic range, purchase volume, etc. For example, operations research techniques can be used such as making use of previous bidding patterns, modeling, and estimating probabilities. For example, bids can be given weights based on various characteristics or goals.

At block 414, the content of the advertising bids can be evaluated. For example, content that is unrelated to the event can be flagged to be rejected. For example, inappropriate adult advertising can be flagged for family-friendly events. For example, competitors can be flagged according to exclusivity advertising right agreements.

In some examples, the event can be a repeating event and the bidding timeframe can be a repeating bidding timeframe. The bidding timeframe can include incremental time slots. Selecting one of the advertising bids can be performed by choosing the largest payment. Selecting one of the advertising bids can include weighting the advertising bids according to categories.

At block 416, it is determined whether any bids are rejected. If so, then another bid can be selected at block 412. If not, then method 400 continues at block 416.

At block 418, the selected bidder can be provided with advertising rights for the event. The advertising rights can be limited to the event timeframe.

At block 420, an advertisement can be received from the selected bidder. For example, advertisements for beer, peanuts and hotdog specials at concession stands in or near the football stadium can be shown to fans using the free Wi-Fi at the stadium. The method 400 ends at block 422.

The method 400 can include continuously accepting or rejecting bids as the come in and adjusting the ranking accordingly. The method 400 can include blocking a bidder associated with a rejected bid and a blacklist of bidders associated with rejected bids can be stored.

For example, a company can place a bid to sponsor free Wi-Fi at an event and if their bid is selected, then the company can be identified as the sponsor when users connect to the free Wi-Fi for the event. For example, a winning bid can result in a video advertisement playing for users of the free Wi-Fi service. For example, a requestor can bid $1,000 for each of the next five hours to advertise a coffee shop located in the network service area and if this bid is selected, then an ad for the local coffee shop will be provided to service users for the next five hours after an agreement for the advertising rights is made. For example, the highest bid can be selected and a status of current bidding can be provided on a website or with text alerts, encouraging bidders to outbid one another until the bidding timeframe expires. For example, there is a parade going on and businesses along the parade route can bid for special offers and promotions to be provided with the free Wi-Fi on the parade grounds around the time that the parade is taking place. For example, the event can be a football game on a university campus and advertising bids can be solicited for the Wi-Fi service at the stadium. The winning bids can push advertisements to users through the Wi-Fi network at the stadium around the time of the football game. For example, bidders can be in the localized network or bidders can be outside the network but with a service or product associated with the event in the region. For example, an event can be a charity fundraiser and the bidding process can be associated with donations.

Figure 5:
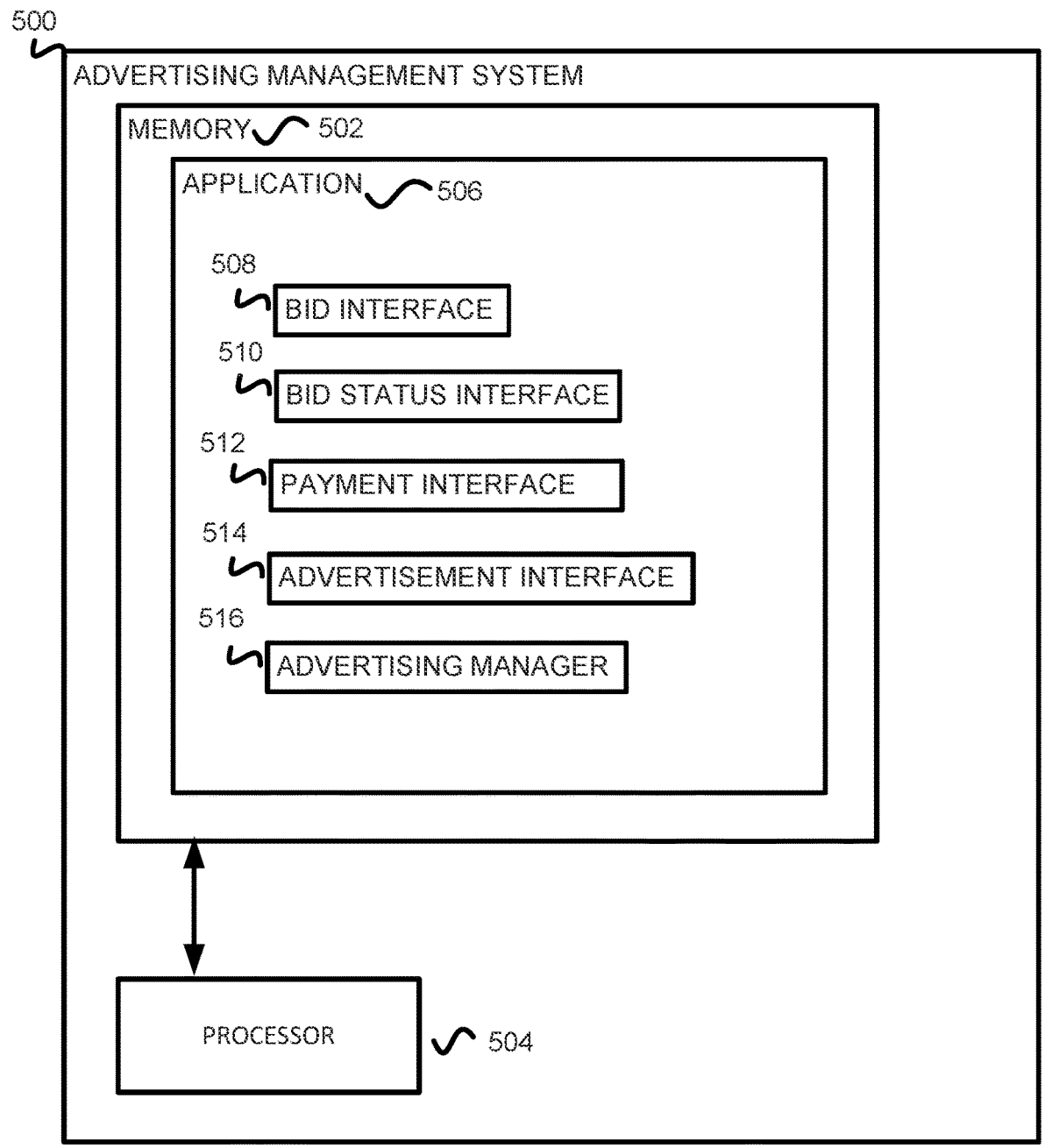
FIG. 5 is diagram of an application for message management in localized networks according to an example embodiment of the disclosure.

FIG. 5 is diagram of an application 506 for message management in localized networks according to an example embodiment of the disclosure. An message management system 500 comprises a memory 502 and a processor 504. The memory 502 can store the application 506 and the application 506 can be accessed by the processor 504. The application 506 comprises a bid interface 508 for sending an advertising bid; a bid status interface 510 for receiving a status of a bid at the end of a bidding timeframe; a payment interface 512 for sending payment information; an advertisement interface 514 for sending an advertisement; and a message manager 516. For example, the application 506 can be installed on a mobile phone and can work with other applications such as text messaging, browser, and phone. For example, the application 506 can be part of a cell site for a cellular network service.

The message manager 516 can solicit advertising bids associated with an event in a network and a bidding timeframe. The advertising manager 516 can receive advertising bids for the event during the bidding timeframe. The message manager 516 can select one of the advertising bids from a selected bidder upon expiration of the bidding timeframe. The message manager 516 can receive payment information from the selected bidder. The message manager 516 can receive the advertisement from the selected bidder. The message manager 516 can present the advertisement at an access point for the network. The message manager 516 can collect payment associated with the payment information.

Figure 6A:
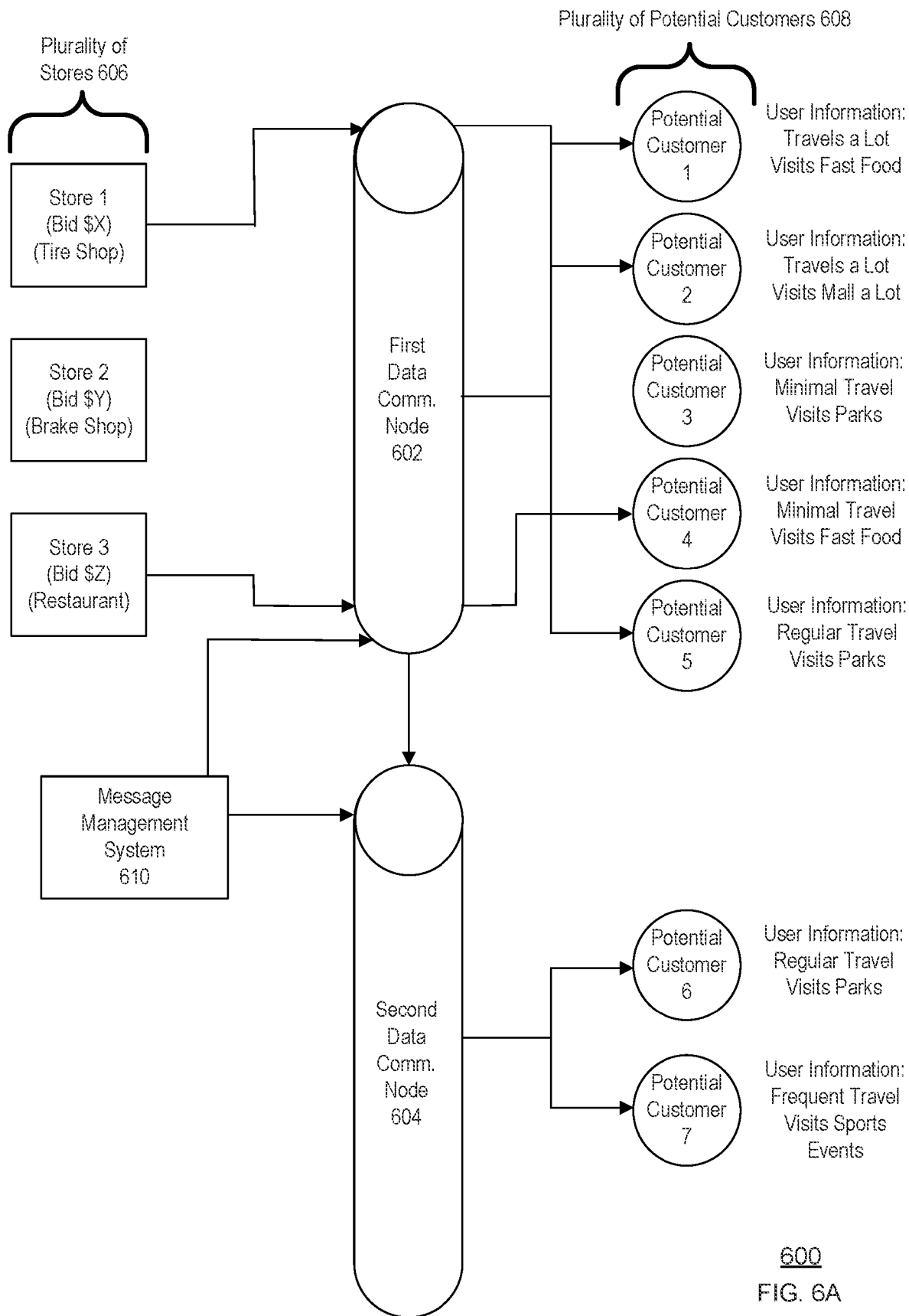
FIG. 6A is a diagram of a data communication network according to an example embodiment of the disclosure.

FIG. 6A is a diagram of a data communication network 600 according to an example embodiment of the disclosure. The data communication network 600 can comprise a first data communication node 602, a second data communication node 604, a plurality of stores 606 shown as store 1, store 2, and store 3, a plurality of potential customers 608 shown as potential customer 1, potential customer 2, potential customer 3, potential customer 4, potential customer 5, potential customer 6, and potential customer 7, and a message management system 610. The first data communication node 602 and second data communication node 604 can be in data communication with each other, the plurality of stores 606, the plurality of potential customers 608, and the message management system 610, either directly or via one or more networks. While FIG. 6A illustrates a certain number of these components, it is understood that the data communication network 600 can include any number of components and that data communication nodes can establish many-to-many connections with stores and potential customers. As used herein, the term "store" can refer to any retailer, merchant, vendor, commercial or industrial business entity, or an individual acting in his or her business or personal interest.

The first data communication node 602 can be a cell tower providing cellular data and/or Wi-Fi, a satellite, a network-enabled computer, other broadcasting device, or a combination thereof. The first data communication node 602 can be, for example, one of or a combination of the exemplary network systems illustrated in FIGS. 3A-3D. The first data communication node 602 can be in data communication with the plurality of stores, shown as store 1, store 2, and store 3 in FIG. 6A, by, e.g., communicating with one or more client devices or other network-enabled computers associated with each of the plurality of stores 606. The first data communication node 602 can be in data communication with the plurality of potential customers 608, shown as potential customer 1, potential customer 2, potential customer 3, potential customer 4, potential customer 5, potential customer 6, and potential customer 7 in FIG. 6A, by, e.g., communicating with one or more client devices or other network-enabled computers associated with each of the plurality of customers 608. The second data communication node 604 and can be a cell tower providing cellular data and/or Wi-Fi, a satellite, a network-enabled computer, other broadcasting device, or a combination thereof. The second data communication node 604 can be, for example, one of or a combination of the exemplary network systems illustrated in FIGS. 3A-3D. The second data communication node 604 can be in data communication with potential customer 6 and potential customer 7 of the plurality of customers 606, as shown in FIG. 6A.

The plurality of stores 606 are shown in FIG. 6A as store 1, store 2, and store 3. Each of these stores can be associated with a merchant offering goods or services for sale. For example, store 1 can be a tire store offering tires for vehicles such as automobiles, trucks, and motorcycles. As another example, store 2 can be a brake shop offering brake parts and brake repair services for vehicles. As another example, store 3 can be a restaurant, offering food for dine-in, takeout, or delivery. Upon receipt of a broadcast event message containing bid information that is generated by the message management system 610 and transmitted via first data communication node 602, each of the plurality of stores 606 can evaluate the broadcast event message and the bid information and submit a bid during a bidding timeframe, as previously described herein.

In some examples, the bids can specify a geographic radius for which a particular store desires to advertise. For example, if store 3 is a restaurant having one location, store 3 can limit the broadcast of its advertisement to an audience within a particular geographic area, such as a city, a region, a set distance, one or more data communication nodes, or a combination thereof. As another example, if store 1 is a chain of tire shops having multiple locations, store 1 can choose to broadcast its advertisement to a larger audience. In other examples, bids can also specify preferred customer characteristics, such as customer location, age, lifestyle, income level, past or similar purchase activity, and preferences, which may be known from transaction history or customer profiles maintained by the plurality of stores 606. The bids can also select particular customers or customer characteristics from the bid information provided by the message management system 610.

The plurality of potential customers 608 are shown in FIG. 6A as potential customer 1, potential customer 2, potential customer 3, potential customer 4, potential customer 5, potential customer 6, and potential customer 7. Upon accessing the data communication network 600 and establishing data communication with one of the first data communication node 602 or second data communication node 604, the client devices or other network-enabled computers associated with each of the plurality of customers 608 can transmit identifying user information to the data communication network 600. This can include, for example, an access token, login credentials to an account, a user profile associated with a device accessing the network, or another form of user information. The user information can comprise, without limitation, user name, user account number, device name, device identifiers (e.g., network address, universally unique identifiers (UUIDs)), user transaction history, user preferences, and any additional information or features supplied by the user. For example, as shown in FIG. 6A, user information associated with potential customer 1 can show that potential customer 1 travels frequently and visits fast food restaurants, user information associated with potential customer 2 can show that potential customer 2 travels frequently and visits shopping malls, user information associated with potential customer 3 can show that potential customer 3 travels infrequently and visits parks, user information associated with potential customer 4 can show that potential customer 4 travels infrequently and visits fast food restaurants, user information associated with potential customer 5 can show that potential customer 5 travels regularly and visits parks, user information associated with potential customer 6 can show that potential customer 6 travels regularly and visits parks, and user information associated with potential customer 7 can show that potential customer 7 travels frequently and attends sporting events.

In some examples, user information can be required by the data communication network 600 in exchange for access to the network. In other examples, user information can be required by the data communication network 600 in exchange for a particular benefit or promotion, e.g., free or reduced price cellular data or Wi-Fi access, free or reduced price calling, a coupon, discount, or special offer at any of the plurality of stores 606. The user information can be collected by the data communication network 600 upon granting access and can be periodically or continuously re-requested or updated to maintain accuracy and completeness in preparing bid information.

The message management system 610 can generate a broadcast event message in accordance with the examples described above. The broadcast event message can include current bid information collected from the data communication network 600 and, in some examples, the data communication network 600 can update the bid information prior generation of the broadcast event message. In some examples, the message management system can generate multiple broadcast event messages based on characteristics or advertising needs of particular stores within the plurality of stores 606.

In the example illustrated in FIG. 6A, after the broadcast event message has been generated and transmitted to the plurality of stores 606, the bidding process commences. Store 1 bids a first amount, store 2 bids a second amount, and store 3 bids a third amount and, upon expiration of the bidding time, it is determined that store 1 has won the right to the advertisement. The advertisement can be presented to the potential customers that are likely to be receptive to its advertisement, which can be potential customer 1, potential customer 2, potential customer 5, potential customer 6, and potential customer 7, which travel regularly or frequently and engage in activities outside of the home (visiting restaurants, malls, parks, and sporting events). In other embodiments, the broadcast event message can identify this group of potential customers and tailor the bid information to this group. It is likely that that store 1, a chain of tire shops, would win the right to the advertisement under this scenario as well, as the group of potential customers is likely to be receptive to its advertisement. The advertisement can be delivered to potential customer 1, potential customer 2, and potential customer 5 via first data communication node 602 and to potential customer 6 and potential customer 7 via second data communication node 604. The advertisement can be delivered once, according to a schedule over a period of time, in connection with a particular event, or any combination thereof.

In some examples, the message management system 610 can apply one or more rules to generate a broadcast event module. The rules applied can take into account various considerations, such as federal, state, and local laws, geographic considerations, store information provided by the plurality of stores 606, user information from the plurality of potential customers 608, store information provided by other stores, and user information provided by other potential customers. For examples, rules regarding laws, legal restrictions, age restrictions, geographic restrictions, types of goods and services, product availability and inventory, user information, and store information, or any combination thereof, can be applied. To facilitate the application of rules, the broadcast event message can include one or more classifications for the potential advertisement. Exemplary classifications can include, without limitation, product classifications (e.g., consumer goods, durable goods, industrial goods, hazardous materials), servicing classifications (e.g., subscription model, one-time payment, recurring transaction), goods classifications (e.g., auto parts, food, beverage, alcohol, furniture, event tickets, club memberships, firearms), service classifications (e.g., entertainment services, utilities, video streaming services, gaming services, cleaning services, professional services such as tax preparation and legal advice, medical services, educational services), and legal classifications (e.g., legal restrictions, age restrictions, geographic restrictions). Exemplary rules include, without limitation, rule prohibiting the advertisement of alcohol to potential customers under the age of 21, a rule prohibiting the advertisement of alcohol in a dry county, a rule prohibiting advertisements for R-rated movies to users under the age of 17, and a rule prohibiting advertisements for animal meat products to users submitting user information that identifies vegetarian or vegan preferences.

In some examples, store information can include information provided by one or more stores currently seeking to purchase advertisements, and can also include information collected previously from stores currently seeking to purchase advertisements, information collected from stores previously seeking to purchase advertisements, and information collected from stores for purposes other than purchasing advertisements. Exemplary store information can include, without limitation, advertisements purchases, successful bids submitted, unsuccessful bids submitted, goods and services offered for sale, product availability, inventory, sales, promotions, and special offers, store location(s) and geographic range, locations of customers, customer profiles, locations of suppliers, and targeted geographic areas for sales growth.

In some examples, the message management system 610 can employ one or more predictive models to identify potential advertisements and generate broadcast event messages. Machine learning based on the user information, store information, rules, laws, and other collected information can be utilized to generate and train one or more predictive models for these purposes. The one or more generated predictive models can be applied to identify potential advertisements and generate broadcast event messages. For example, the one or more predictive model can be trained by, and applied to, one or more datasets of information, such as datasets comprising the user information and store information currently collected by the data communication network 660, as well as to datasets comprising previously collected user information and store information.

The message management system 610 can utilize various neural networks, such as convolutional neural networks ("CNN") or recurrent neural networks ("RNN"), to generate the exemplary models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences. In other examples, unsupervised learning can be utilized.

In some examples, for purposes of model generation and training, user information and store information can be used, whether current or previously-collected. In addition, training datasets can also be periodically, continuously, or dynamically updated as additional information is collected by the data communication network 600 and as additional information becomes available. Exemplary additional information can include, without limitation, previously generated broadcast event messages and bidding information associated therewith, previous advertisements, store bids in response to previously generated broadcast event messages, advertisements purchased in response to previously generated broadcast event messages, potential customer in response to previous advertisements, purchases made by customers in response to previous advertisements, and any combination thereof.

In some examples, a subset of the plurality of customers 608 can be identified and developed into a targeted customer group. The targeted group can be formed based on bid history, user information, store information, preferred customer characteristics, transaction history, customer profiles, or any combination thereof. The broadcast event messages and bid information can be directed to one or more of the targeted customer group, which has the benefits of offering more relevant broadcast messages to the customers in the targeted customer group and directing broadcast event messages more accurately and efficiently to likely interested customers. The message management system 610 can employ machine learning techniques and the one or more predictive models to identify commonalities between the plurality of customers 608 and group customers into one or more targeted customer groups. Machine learning-based methods of clustering data including without limitation, partitioning methods hierarchical clustering, fuzzy clustering, density-based clustering, and model-based clustering, can be employed to form the one or more targeted customer groups.

Figure 6B:
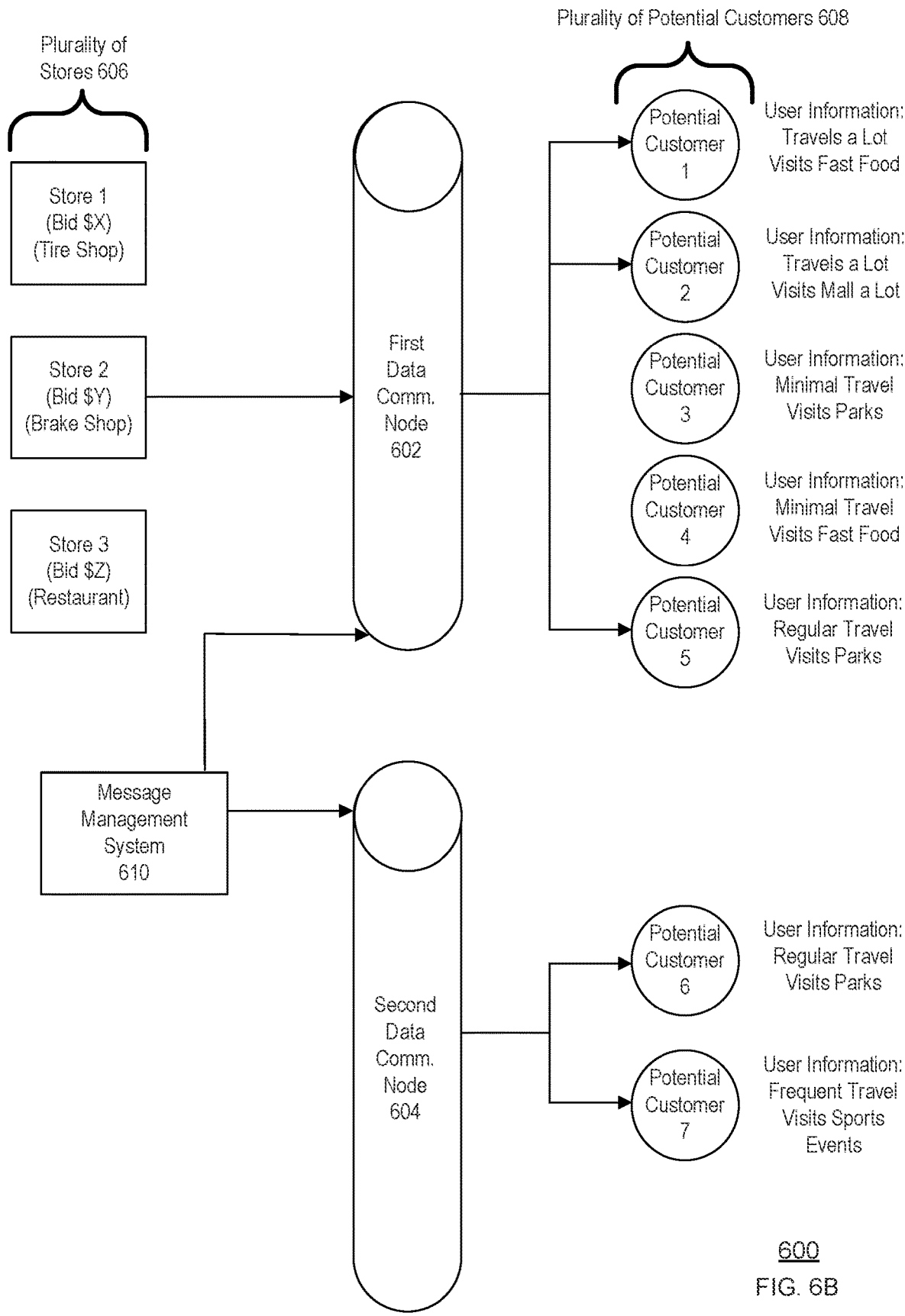
FIG. 6B is a diagram of a data communication network according to an example embodiment of the disclosure.

FIG. 6B is a diagram of a data communication network 600 according to an example embodiment of the disclosure. The data communication network 600 of FIG. 6B can comprise the same components as FIG. 6B, including the first data communication node 602, the second data communication node 604, the plurality of stores 606 shown as store 1, store 2, and store 3, the plurality of potential customers 608 shown as potential customer 1, potential customer 2, potential customer 3, potential customer 4, potential customer 5, potential customer 6, and potential customer 7, and the message management system 610. As with FIG. 6A, FIG. 6B illustrates a certain number of these components but it is understood that the data communication network 600 can include any number of components and that data communication nodes can establish many-to-many connections with stores and potential customers.

As shown in FIG. 6B, a second broadcast event message can be generated based on the collected identification information or based on updated identification information. The second broadcast event message can be generated and transmitted to the plurality of stores 606 simultaneously with, or subsequent to, the first broadcast event message previously described. The second broadcast event message can be based on similar or different aspects of the identification information and/or the needs of the merchants associated with the plurality of stores 606. For example, store 2 can have submitted a bid in response to the first broadcast event message but did not bid as large an amount as store 1, for a variety of reasons including availability of funds for advertisements and the perception of how receptive the identified potential customers will be. The second broadcast event message can be targeted to the same or similar set of potential customers using the same or similar identification information, or the second broadcast event message can be directed to a different set of potential customers using the same or similar identification messages. In either case, the second broadcast event message can give store 2 a second opportunity to bid on an advertisement.

Accordingly, a second bidding process in response to the second broadcast event message can be completed within a second bidding timeframe. Store 2 can again submit a bid and, in this embodiment, store 2 can be determined to be the winner over a bid submitted by store 3 and therefore store 2 has won the right to a second advertisement. The second advertisement can be presented to the potential customers that are likely to be receptive to its advertisement, which can be potential customer 1, potential customer 2, and potential customer 5, which travel regularly or frequently and engage in activities outside of the home (visiting restaurants, malls, and parks). In this example, however, store 2 can be a brake shop with one location offering brake parts and repair services, and the second event broadcast message and/or the bid by store 2 can specify that the second advertisement is only to be broadcast in the geographic area (e.g., city, town, mileage range) of the location of store 2 and/or on only nearest data communication node to the location of store 2, which is the first data communication node 602. The second advertisement can be delivered once, according to a schedule over a period of time, in connection with a particular event, or any combination thereof.

In other embodiments, the second broadcast event message can identify this group of potential customers and tailor the bid information to this group. The second advertisement can therefore be delivered to potential customer 1, potential customer 2, and potential customer 5 via first data communication node 602 without being transmitted to potential customer 6 and potential customer 7 via second data communication node 604. The second advertisement can be delivered once, according to a schedule over a period of time, in connection with a particular event, or any combination thereof.

In some embodiments, the plurality of stores 606 can more actively participate in the bidding process by including a counter-offer to one or more aspects of the bid information. For example, a store can counter-offer on the price, duration, region, potential customers, targeted customer groups, and any other aspect of the bid information and the broadcast event message, and this counter-offer can be analyzed and ranked in the same manner as described herein. This can provide the benefits of improved tailoring of bid information to the stores, increased engagement of stores in the bidding process, and the collection of useful counter-offer bid information by the message management system 610. The counter-offer bid information can be stored by the message management system 610 and utilized to train predictive models, better identify bid opportunities, better target broadcast event messages, and improve the relevance and attractiveness of broadcast event messages.

Figure 6C:
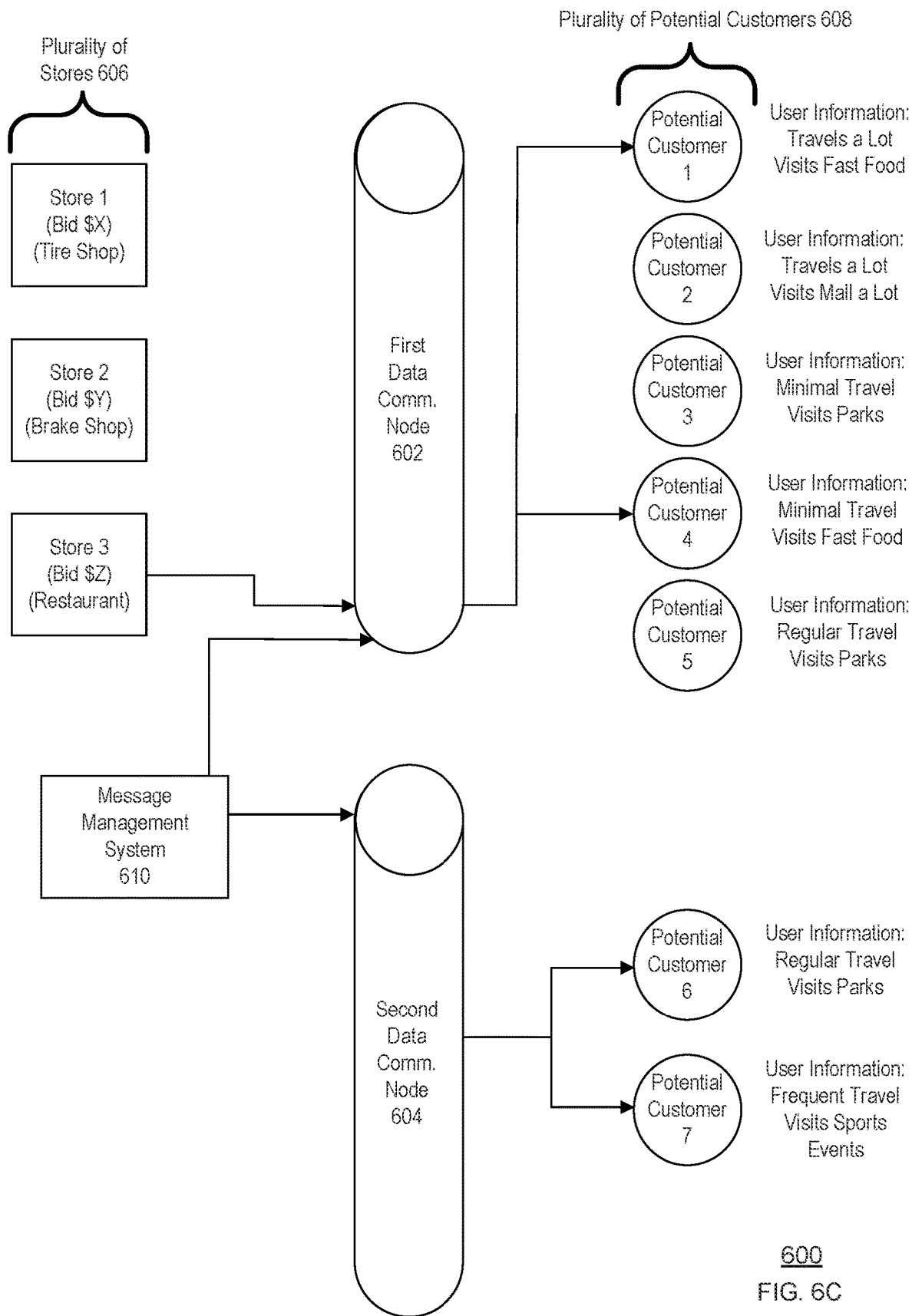
FIG. 6C is a diagram of a data communication network according to an example embodiment of the disclosure.

FIG. 6C is a diagram of a data communication network 600 according to an example embodiment of the disclosure. The data communication network 600 of FIG. 6C can comprise the same components as FIGS. 6A and 6B, including the first data communication node 602, the second data communication node 604, the plurality of stores 606 shown as store 1, store 2, and store 3, the plurality of potential customers 608 shown as potential customer 1, potential customer 2, potential customer 3, potential customer 4, potential customer 5, potential customer 6, and potential customer 7, and the message management system 610. As with FIGS. 6A and 6B, FIG. 6C illustrates a certain number of these components but it is understood that the data communication network 600 can include any number of components and that data communication nodes can establish many-to-many connections with stores and potential customers.

As shown in FIG. 6C, a third broadcast event message can be generated based on the collected identification information or based on updated identification information. The third broadcast event message can be generated and transmitted to the plurality of stores 606 simultaneously with, or subsequent to, the first and second broadcast event messages previously described. The third broadcast event message can be based on similar or different aspects of the identification information and/or the needs of the merchants associated with the plurality of stores 606. For example, store 3 can have submitted a bid in response to the first broadcast event message and in response to the second broadcast event message but did not bid as large an amount as store 1 and store 2, respectively, for a variety of reasons including availability of funds for advertisements and the perception of how receptive the identified potential customers will be. The third broadcast event message can be targeted to the same or similar set of potential customers using the same or similar identification information, or the second broadcast event message can be directed to a different set of potential customers using the same or similar identification messages. In either case, the third broadcast event message can give store 3 a third opportunity to bid on an advertisement.

Accordingly, a third bidding process in response to the third broadcast event message can be completed within a third bidding timeframe. Store 3 can again submit a bid and, in this embodiment, store 3 can be determined to be the winner and therefore store 3 has won the right to a third advertisement. The third advertisement can be presented to the potential customers that are likely to be receptive to its advertisement, which can be potential customer 1 and potential customer 4, which frequently visit fast food restaurants. In this example, however, store 3 can be a restaurant offering dine-in, takeout, and delivery service from one location, and the third event broadcast message and/or the bid by store 2 can specify that the third advertisement is only to be broadcast in the geographic area (e.g., city, town, mileage range) of the location of store 2 and/or on only nearest data communication node to the location of store 3, which is the first data communication node 602. The third advertisement can be delivered once, according to a schedule over a period of time, in connection with a particular event, or any combination thereof.

In other embodiments, the third broadcast event message can identify this group of potential customers and tailor the bid information to this group. The third advertisement can therefore be delivered to potential customer 1, potential customer 2, and potential customer 5 via first data communication node 602 without being transmitted to potential customer 6 and potential customer 7 via second data communication node 604. The third advertisement can be delivered once, according to a schedule over a period of time, in connection with a particular event, or any combination thereof.

Figure 7:
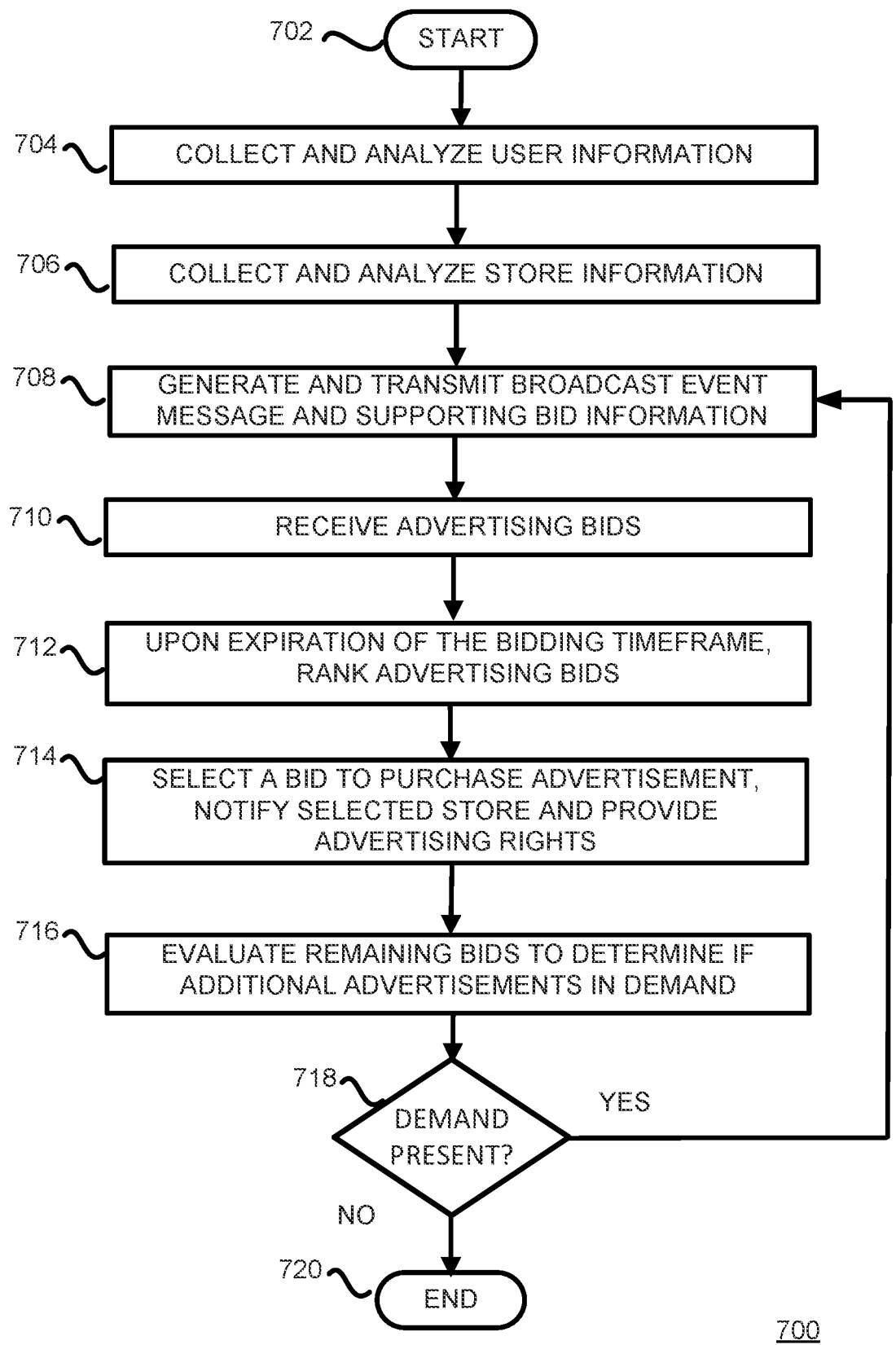
FIG. 7 is a diagram of a method for message management in localized networks according to an example embodiment of the disclosure.

FIG. 7 is flow chart of a method 700 for message management in localized networks according to an example embodiment of the disclosure. The method 700 starts at block 702.

At block 704, user information can be collected by a data communication network. The user information can be collected from client devices connected to the data communication network through the provision by the client devices of an access token in exchange for access to the data communication network. In another example, user information can be collected from user profiles and/or accounts associated with users of the client devices upon connecting to the data communication network. In another example, user information can be collected from one or more databases storing previously-collected data associated with the currently connected client devices or their users.

At block 706, store information can be collected and analyzed. The store information can be provided by stores seeking to purchase advertisements and from one or more databases storing previously-collected store information.

At block 708, a broadcast event message can be generated and transmitted, and the broadcast event message can include bid information. The broadcast event message and bid information can be generated by the application of one or more rules, the application of one or more predictive models, or any combination thereof. Bid information can include any information relevant to the bid, including without limitation, the number of devices in communication, device characteristic for those devices (e.g., device brand, device model, device features such as display size, data connectivity, etc.), the number of users connected to the network, demographic information about users (e.g., age, location), and user transaction history preference information (e.g., interests, affiliations, prior transactions, goods and services purchased, advertisements viewed). In some examples, the bid information can be updated periodically, or continuously as the bid information changes.

At block 710, following transmission of the broadcast event message, a bidding timeframe can commence and one or more bids can be received from stores seeking to purchase the advertisement. In some examples, in the event bid information changes, or more subsequent broadcast event messages or by sending supplemental messages to update a portion of the bid information contained in the broadcast event message. In some examples, bids can be received on a website application, by text message, or phone call. For example, bids can be received by a bid or payment system such that it ensures transaction of payment before the bid is accepted. For example, bids can be discarded if they fail to meet certain minimum requirements. For example, a bidder can preload an account that allows them to make a bid. If no pre-check or evaluation is made on bids, a deficient bid can be rejected at block 714 of method 700.

At block 712, upon expiration of the bidding timeframe, the bids can be ranked. For example, bids can be ranked primarily by price and secondarily by location. For example, the bids can be ranked by expected value. Any kind of ranking, weighting and/or sorting of the bids can be done. For example, different categories of advertisements can be given different weights and then the bids can be ranked by weight. In some examples, the ranking can be performed by one or more predictive models.

At block 714, one of the advertising bids can be selected from a selected bidder. This selection can be made based on the ranking performed at block 712. In some examples, bid selection criteria can include the highest price, the geographic range, purchase volume, etc. For example, operations research techniques can be used such as making use of previous bidding patterns, modeling, and estimating probabilities. For example, bids can be given weights based on various characteristics or goals. Upon the selection of a bid, the advertising rights can be provided and the advertisement can be purchased and subsequently broadcast.

At block 716, the remaining bids submitted can be evaluated to determine if additional advertisements may be in demand. This evaluation can be performed by the application of one or more rules, the application of one or more predictive models, or any combination thereof. This evaluation can also include user information and store information.

At block 718, it can be determined if the demand for additional advertisements is present. If the demand is present, the method 700 can select the "YES" option and return to block 708 for the generation of one or more broadcast event messages and bid information. If the demand is not present, the method 700 can select the "NO" option and proceed to block 720, where the method 700 ends.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it could.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A message management system comprising a processor and a memory, wherein the processor is configured to:
apply a predictive model to user information to generate a broadcast message, wherein the broadcast message solicits message requests for entry into a bidding process associated with an event in a network service area and a bidding timeframe,
transmit the broadcast message over a network to a plurality of client devices,
receive, from the plurality of client devices, message requests for the event during the bidding timeframe,
select one of the message requests, wherein the selection of one of the message requests is made after an expiration of the bidding timeframe, and
receive an event message from one of the plurality of client devices, the one of the plurality of client devices being associated with the selected message request.

2. The message management system of claim 1, wherein the processor is configured to collect user information from the plurality of client devices.

3. The message management system of claim 1, wherein the predictive model is a machine learning model trained on a training dataset.

4. The message management system of claim 1, wherein the processor is configured to present the event message at the event in the network service area.

5. The message management system of claim 1, wherein the broadcast message comprises advertising bid information for the event in the network service area.

6. The message management system of claim 5, wherein the advertising bid information comprises:
an identification of a number of devices connected to the network, and
device characteristics for each of devices connected to the network.

7. The message management system of claim 1, wherein the event message comprises an advertisement to be presented at the event in the network service area.

8. The message management system of claim 1, wherein the processor is configured to filter the message requests by accepting or rejecting each of advertising bids included in the message requests.

9. The message management system of claim 1, wherein the processor is configured to provide the selected message request with advertising rights for the event in the network service area.

10. The message management system of claim 9, wherein the processor is configured to limit the advertising rights to an event timeframe associated with the event the event in the network service area.

11. A method performed by a message management system comprising a processor and a memory, comprising:
applying a predictive model to user information to generate a broadcast message, wherein the broadcast message solicits message requests for entry into a bidding process associated with an event in a network service area and a bidding timeframe;
transmitting the broadcast message over a network to a plurality of client devices;
receiving, from the plurality of client devices, message requests for the event during the bidding timeframe;
selecting one of the message requests, wherein the selection of one of the message requests is made after an expiration of the bidding timeframe; and
receiving an event message from one of the plurality of client devices, the one of the plurality of client devices being associated with the selected message request.

12. The method of claim 11, further comprising raining the predictive model using machine learning and a training dataset.

13. The method of claim 11, further comprising:
receiving payment information from the client device being associated with the selected message request;
processing the payment information; and
receiving a payment associated with the payment information from the client device being associated with the selected message request.

14. The method of claim 11, wherein:
the network is a cell tower that provides a Wi-Fi service; and
the event message is provided at an access point for the Wi-Fi service.

15. The method of claim 11, further comprising applying a rule to the broadcast message, wherein the rule comprises at least one selected from a group consisting of an age restriction and a geographic restriction.

16. The method of claim 11, further comprising applying a rule to the broadcast message, wherein the rule comprises at least one selected from a group consisting of a type of goods or service, a product availability, and a product inventory.

17. The method of claim 11, further comprising applying a rule to the broadcast message, wherein the rule comprises at least one selected from a group consisting of user information and store information.

18. The method of claim 11, further comprising applying a rule to the broadcast message, wherein the rule comprises at least one classification selected from a group consisting of a product classification, a servicing classification, a good classification, and service classification, and a legal classification.

19. The method of claim 11, further comprising blocking a bidder associated with a rejected message request.

20. The method of claim 11, further comprising ranking the message requests by at least one selected from a group consisting of price, location and expected value.

21. A computer readable non-transitory medium comprising compute-executable instructions that, when executed by a message management system, cause the message management system to perform operations of:
applying a predictive model to user information to generate a broadcast message, wherein the broadcast message solicits message requests for entry into a bidding process associated with an event in a network service area and a bidding timeframe;
transmitting the broadcast message over a network to a plurality of client devices;
receiving, from the plurality of client devices, message requests for the event during the bidding timeframe;
selecting one of the message requests, wherein the selection of one of the message requests is made after an expiration of the bidding timeframe; and
receiving an event message from one of the plurality of client devices, the one of the plurality of client devices being associated with the selected message request.

* * * * *